United States Patent [19]

Tanaka et al.

[11] Patent Number: 5,050,126
[45] Date of Patent: Sep. 17, 1991

[54] BUFFER MEMORY CONTROL APPARATUS

[75] Inventors: Atsushi Tanaka; Tsuyoshi Watanabe, both of Hadano, Japan

[73] Assignee: Hitachi, Ltd., Tokyo, Japan

[21] Appl. No.: 252,686

[22] Filed: Oct. 3, 1988

[30] Foreign Application Priority Data

Oct. 7, 1987 [JP] Japan ................................ 62-251472

[51] Int. Cl.[5] ...................... G11C 7/00; G11C 11/407
[52] U.S. Cl. ........................... 365/189.07; 365/230.08;
365/230.03; 365/189.05; 364/900
[58] Field of Search ...................... 365/230.01, 230.06,
365/230.08, 230.03, 230.04, 189.05, 189.07;
364/200 MS File, 900 MS File

[56] References Cited

U.S. PATENT DOCUMENTS

| 4,218,743 | 8/9180 | Hoffmann et al. | 364/200 |
| 4,561,071 | 12/1985 | Hashimoto et al. | 365/189.07 |
| 4,577,293 | 3/1986 | Matick et al. | 365/189.04 |
| 4,638,426 | 1/1987 | Chang et al. | 364/200 |
| 4,943,914 | 7/1990 | Kubo | 364/200 |

Primary Examiner—Alyssa H. Bowler
Attorney, Agent, or Firm—Fay, Sharpe, Beall, Fagan, Minnich & McKee

[57] ABSTRACT

Disclosed is a buffer memory control apparatus, in which a translation lookaside buffer for translating a logical address into a real address to make an access to a buffer storage has a logical address storage portion and a real address storage portion to each of which logical address bits are entered at its column. Column identifying address bits for the logical address storage portion partly overlap on column identifying address for a buffer address array for holding a real address to be supplied to the buffer storage, so that the buffer address array, the real address storage portion, and a comparator circuit for comparing the contents held by the buffer address array and the real address storage portion are divided into sections corresponding to the overlapping bits and the sections are suitably combined and arranged as circuits.

11 Claims, 3 Drawing Sheets

BUFFER MEMORY CONTROL APPARATUS

CROSS-REFERENCES TO RELATED APPLICATIONS

The present invention relates to U.S. Pat. No. 4,943,914 issued July 24, 1940 entitled "STORAGE CONTROL SYSTEM AND LOGIC-IN MEMORY DEVICE THEREOF" filed by K. KUBO, Oct. 20, 1987, and U.S. patent application Ser. No. 07/250,942 entitled "BUFFER MEMORY CONTROL APPARATUS USING ADDRESS TRANSLATION" filed by T. WATANABE, Sept. 29, 1988.

BACKGROUND OF THE INVENTION

The present invention relates to a buffer memory control apparatus.

Such a circuit for controlling a buffer memory is disclosed in U.S. Pat. No. 4,332,010 and JP-B-57-57784.

The latest large-sized and medium-sized electronic computers generally employ a virtual storage system as well as a buffer memory system. The virtual storage system is a system in which a programmer can execute coding without being conscious of the size of a real storage by working with a logical address on a virtual storage not a real address on a real storage. On the other hand, the buffer storage system is a system in which a high-speed and small capacity buffer storage is disposed in a main storage so as to stop a speed gap in the main storage. A storage hierarchical structure is thereby formed because the large capacity main storage is low in processing speed in comparison with an operation speed of the computer.

In a virtual storage system, it is necessary to translate a logical address into a real address prior to accessing the main storage. The translation of a logical address into a real address is carried out by making reference to an address translation table prepared in a program. If such reference is made to the low speed main storage every time translation is to be made, the relative overhead time necessary for the translation is great. In this regard, there is provided a translation lookaside buffer (hereinafter abbreviated to "TLB") for storing pairs of logic/address to real address translations which have been obtained by making reference to the main storage, so that when accessing the main storage, a judgment is made whether the logical address in question exists in the TLB or not prior to accessing. If the logical address exists in the TLB (the probability of this existence is very high because of locality of a program), the real address corresponding to the logical address can be obtained at a high speed from the TLB.

In the buffer storage system, on the other hand, the buffer storage is a copy of a part of the main storage and therefore a buffer address array (hereinafter abbreviated to "BAA") is provided in the buffer storage in order to store the correspondency between logical and real addresses. If a central processing unit starts the main storage reference with a logical address, a judgment is made as to whether a real address corresponding to the logical address translated by the TLB exists in the BAA or not so that when the real address exists in the BAA (the probability of this existence is very high because of locality of a program), necessary data is read out from the buffer storage at a high speed and sent to the central processing unit.

Although the above description has been made such that the references to the TLB and BAA are made serially, it is often necessary to make parallel reference to them in order to make the processing speed high. In this case, the BAA is referred to with a logical address. There are however a system in which BAA column identification is made with a real address portion within a logical address or at an intra-page address, and another system in which the identification is made with a logical address or an address including a part of a page address to be subject to address translation. In the latter system, there is an overlapping in bits of the respective identification addresses to be given to the TLB and BAA.

The present invention is applied to the latter system.

FIG. 1 is a block diagram showing a part of a buffer storage device of the system in which reference is made to the above-mentioned TLB and BAA parallelly. Upon generation of a memory request from a central processing unit, a logical address is stored in a register 91. The entry of the logical address in a TLB 92 is identified by a lower bit b of an upper-rank page address of the logical address. In this example, the TLB 92 is composed of k columns ×2 rows, and the reference numerals 92-1 and 92-2 represent first and second rows respectively. That is, each of the first and second rows has k entries. Each entry in each of the first and second rows 92-1 and 92-2 of the TLB 92 is composed of a logical address portion (L), a validity flag bit portion (V), and a real address portion (R). The logical address portion and real address portion of the TLB are called TLBLA and TLBRA respectively. The contents of the portions L and V read out from each row of the TLB 92 are compared with an upper bit a of the page address in the register 91 by corresponding logical address comparators 94-1 and 94-2 respectively.

The BAA is identified with an upper bit c of a lower rank intra-page address of a virtual address. In this embodiment, the BAA 93 is composed of l columns ×2 rows and the reference numerals 93-1 and 93-2 represent first and second rows respectively. That is, each row has l entries. Each entry of the BAA 93 is composed of a real address portion (R) and a validity flag bit portion (V). Real address comparators 96-1 and 96-2 compare a real address (intra-page address or displacement) read out from the portion R of the TLB 92-1 and entered through a selector 95 or a real address (intra-page address or displacement) directly stored in the register 91 by the central processing unit with the contents read out from the portion R of the corresponding row 93-1 or 93-2 of the BAA 93. The selector 95 is arranged to select the contents of the register 91 when the central processing unit has stored a real address directly in the register 91, or select the contents of the row 92-1 of the TLB 92 when a logical address has been stored in the register 91. Other comparators 97-1 and 97-2 are arranged to compare the real address read out from the portion R of the row 92-2 of the TLB 92 with the real address read out from the portion R of the corresponding rows 93-1 and 93-2 of the BAA 93. Upon detection of incidence between the two inputs, the output of each of the real address comparators 96-1, 96-2, 97-1 and 97-2 becomes "1".

The results of comparison by the real address comparators 96-1, 96-2, 97-1 and 97-2 are entered into an encoder 98, and after selected, an encoded output (one bit in this example) of the encoder 98 is stored in a upper bit of a register 99. An intra-page address of the register 91 is stored in a lower bit of the register 99. Thus, a buffer storage address corresponding to the logical address or real address stored in the register 91 is obtained. A buffer storage is identified with this address of the register 99 and the data thus read out from the buffer storage is transferred to the central processing unit.

Requiring a high speed property as well as a certain capacity, the TLB 92 and BAA 93 are generally constituted by bipolar memories. FIG. 2 shows a bipolar memory to be used for such a purpose.

In FIG. 2, after decoded in an X-address decoder 110 and a Y-address decoder 114, address signals applied to input pins $A_0$-$A_2$ and $A_3$-$A_5$ of the X- and Y-address decoders 110 and 114 actuate a memory cell 112 through drivers 111 and 113 respectively. In this example, the memory cell 112 is composed of $8\times 8$ bits, that is, 64 bits. A selected one bit of the memory cell 112 is led to an output circuit 116 through a sense amplifier 115. The mode becomes a write mode when an input WE (write enable) is valid. In the write mode, an input DI (data-in) is passed through a gate 117 so as to be ANDed with the WE in an AND 118 and another AND 119. Write "1" or Write "0" is made valid by the outputs of the ANDs 118 and 119 so as to give write instructions, through the driver 113, to the bit of the memory cell 112 designated through the address inputs $A_0$-$A_5$.

When used as the aforementioned TLB or BAA, the bipolar memories of the kind as described above are arranged in the form of a matrix to thereby realize a desired word length as well as a desired bit length.

The recent development and improvement of extra high density LSIs has begun to make it possible to realize making electronic computers large in scale and high in processing speed. This tendency will likely be promoted from now on. Thus, logical devices such as operation devices have come to be made of LSIs and to be made high in processing speed. On the other hand, however, the possibility exist that logical portions including bipolar memories may become a critical path which limits a machine cycle in an electronic computer because most parts of the logical portions are occupied by gates which are used to increase addressing to the bipolar memories and to decrease the number of data readings from the bipolar memories, so that it is difficult to constitute the logical portions by LSIs and therefore impossible to make the best use of such LSIs. Further, there is a tendency that a main storage becomes large in its capacity and therefore it is required to make the capacity of a buffer storage large. That is, it is required to increase the BAA capacity. On the other hand, the technique to make bipolar memories highly integrated has been promoted so that it has become possible to realize high speed memories. However, it is not easy to realize a structure of a large capacity BAA by using bipolar memories having such a structure as described above with respect to FIG. 2, because it is required to extremely increase the number of package pins of the bipolar memories.

For example, in the case where a 4K-bit memory is composed of 64 words, each word can accommodate 64 bits, however, about 140 pins are required for address lines, data lines, control lines, and power supply lines, so that the package size of the bipolar memory is limited by the number of those input and output pins.

The above JP-B-57-57784 discloses a device in which a TLB and a BAA are constituted by memories of the type in which comparators are included in an LSI for the BAA. For example, in the JP-B-57-57784, it is intended to solve the above problems by making the portions encircled by broken lines in FIG. 1 be incorporated in a memory chip.

In the above JP-B-57-57784, a real address read out from the TLB is once led to the outside and then entered into the memory chip constituting the BAA so that the real address is compared with a real address read out from the BAA. There is therefore a problem that the number of pins required for input and output of the TLB and BAA increases and propagation delay also increases. There is a further problem that the communication path among the TLB, BAA, comparators provided in a single LSI becomes so long that the signaling time among those elements is prolonged.

SUMMARY OF THE INVENTION

It is therefore an object of the present invention is to provide a buffer memory control apparatus in which the above problems in the prior art are eliminated to thereby reduce the propagation delay as well as to reduce the number of the input and output pins of the package.

It is another object of the present invention is to provide a buffer memory control apparatus in which it is made possible to read out and write data corresponding to a given logical address from and into a buffer memory at a high speed.

In order to achieve the above objects, according to the present invention, each of TLBRA and BAA is divided into a plurality of sections with respect to identification of logical addresses in each column in such a manner that the logical addresses which are quite within the bounds of possibility of simultaneous identification are stored in a region in which transfer of information can be executed at a high speed, for example, one and the same LSI.

According to the present invention, each pair of corresponding units of TLBRA and BAA are incorporated in adjacent regions within one LSI, so that it is possible to reduce the propagation delay as well as to reduce the number of the input and output pins of the package. Since each of the TLBRA and BAA is divided into a plurality of sections with respect to identification logical addresses, it is possible to attain the above reduction in the propagation delay as well as in the pin number even if those TLBRA and BAA are large in their capacity.

BRIEF DESCRIPTION DRAWINGS

Figure 1:
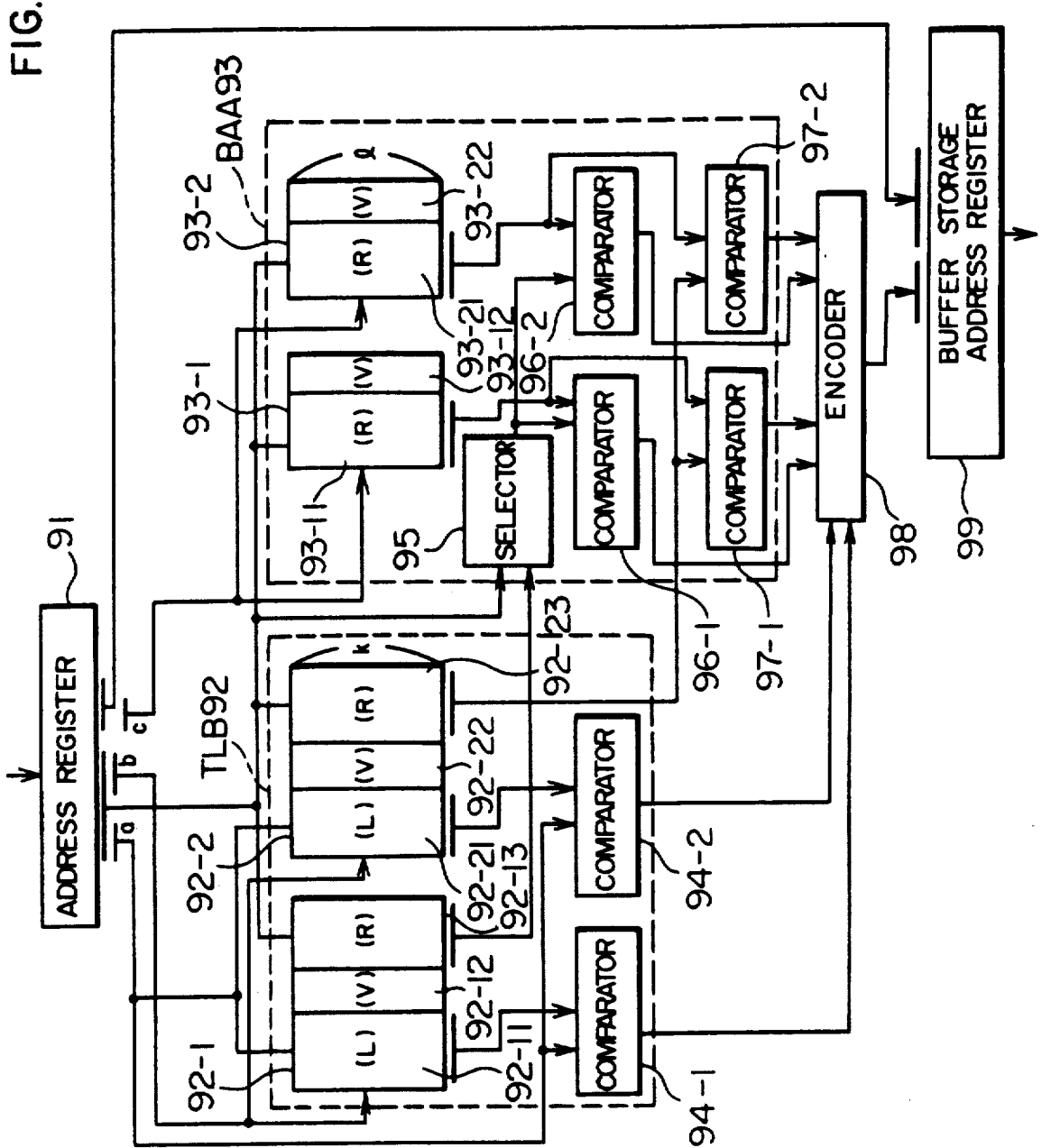
FIG. 1 is a block diagram of a buffer memory control apparatus.
Figure 2:
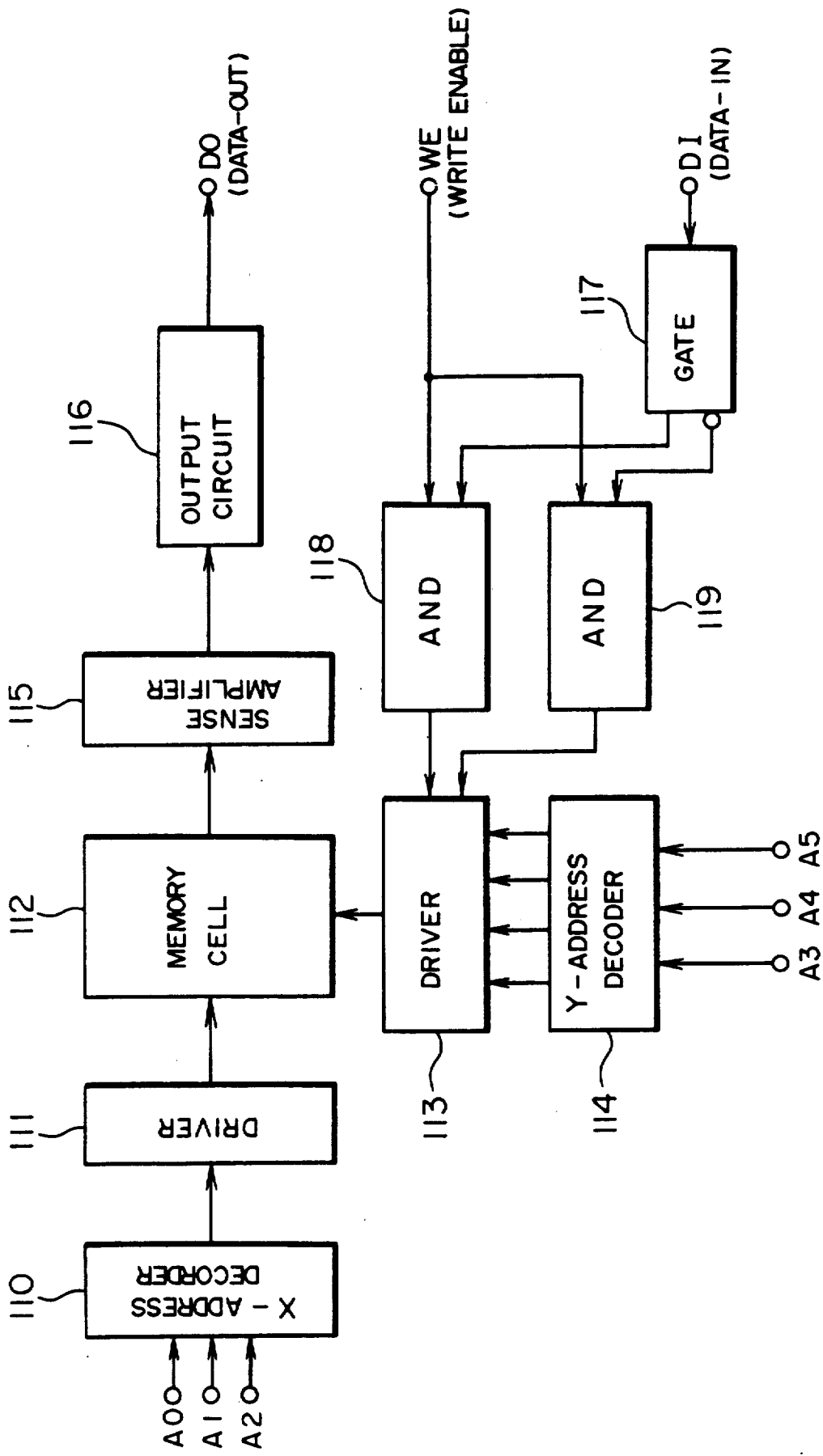
FIG. 2 is a block diagram illustrating a structure of a bipolar memory.
Figure 3:
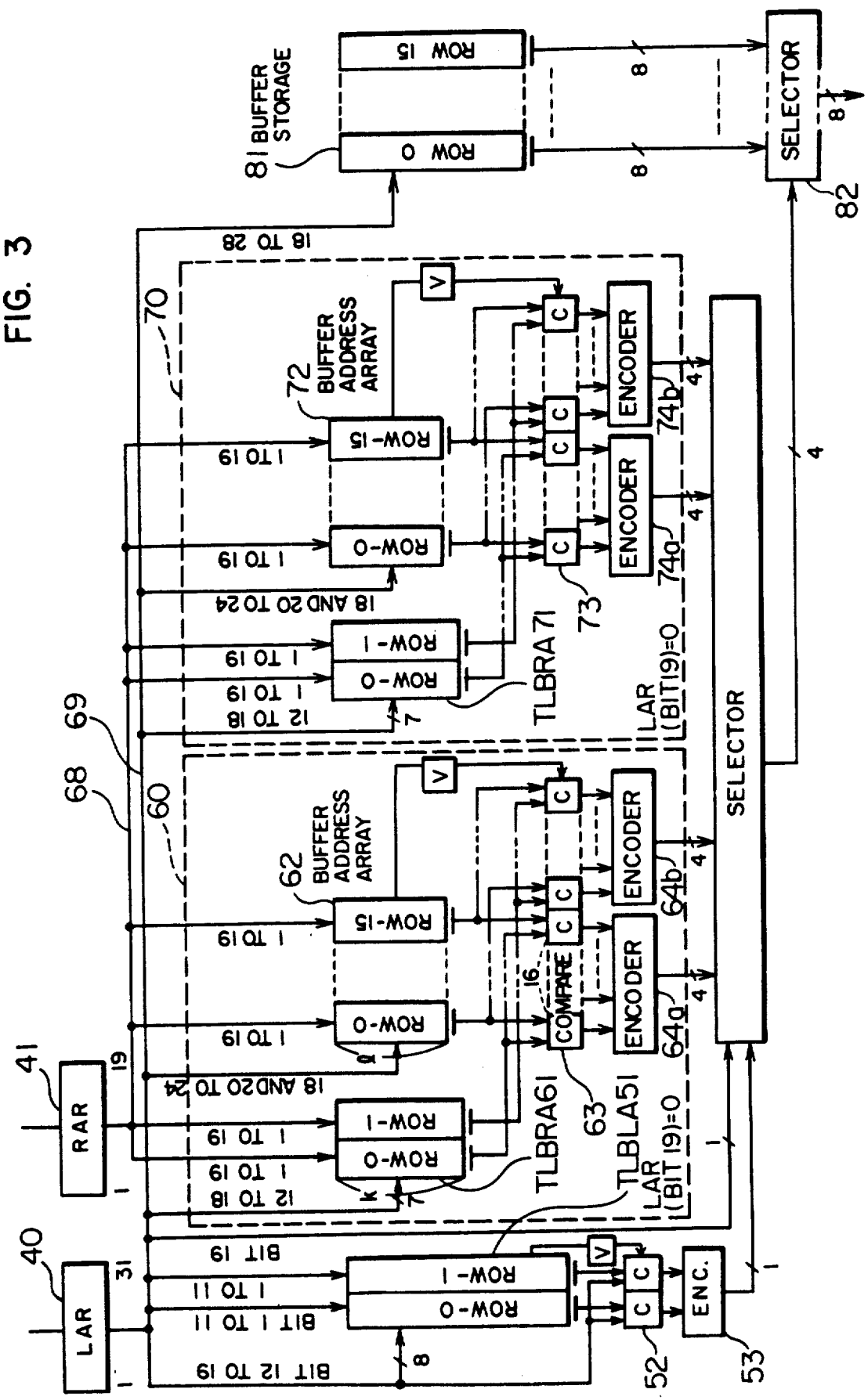

FIG. 3 a block diagram illustrating an embodiment of the buffer memory control apparatus according to the present invention.

DESCRIPTION OF THE PREFERRED EMBODIMENTS

Referring to FIG. 3, an embodiment of the present invention will be described in detail hereunder. In the drawing, the numerals 1-31 attached to devices designate address bit positions and the numerals attached to lines designate the number of signal bits. Each region rectangularly encircled by a broken line is a region in which transfer of information can be made at a high speed. For example, one LSI may be such a region, which is represented as an LSI 60 and an LSI 70 in the following. The reference numerals 40 and more are used to designate other constituent parts.

In FIG. 3, a logical address for instruction fetch or operand fetch is set in a logical address register LAR 40. The logical address is composed of 31 bits from bit 1 to bit 31. In an address translation buffer (TLB, 51, 61, 71), the directory of the entries registered in the TLB is abbreviated to TLBLA, and a data portion in which real addresses are stored is abbreviated to TLBRA. A buffer address array for holding real addresses of the data held in a buffer memory is abbreviated to BAA and the buffer memory is abbreviated to BS.

The logical address set in the LAR 40 is used to make an access to the TLB, the BAA, and the BS. The TLB has two rows the columns of which are identified with the bits 12–19 of the logical address, while the BAA has 16 rows which are identified with the bits 18–24 of the logical address. Data of 16 rows are read out from the BS 81 and one of the data can be selected at a high speed if the TLBRA and BAA can be stored in one and the same LSI (with no inter-IC connection). If the TLBRA and BAA cannot be stored in one and the same LSI, it is necessary to divide the TLBRA and BAA into a plurality of sections so as to store the TLBRA and BAA in a plurality of LSIs. The present invention is intended to show a manner how to divide the TLBRA and BAA.

In this embodiment, address bits 12 to 19 in the column identification logical address are used to identify a column in the translation lookaside buffers TLBRA and address bits 18 to 24 are used to refer or identify a column in the buffer address array BAA. Bits 18 and 19, which are commonly included in both of them, are called common identification bits. The TLBRA is divided into four sections by use of four combinations of (0,0), (0,1), (1,0) and (1,1) of the common bits. Therefore, one of the four sections is accessed when a logical address is provided. In a similar manner, the BAA is divided into four sections using the four combination, one of which is accessed when a logical address is provided. Accordingly, the corresponding combination pair of each section of the TLBRA and the BAA locates in one LSI, respectively, if the whole circuits of the TLBRA and the BAA cannot be located within one LSI. When a logical address is provided, a section of the TLBRA and a section of the BAA both located in one LSI can be accessed, necessarily. In other words, a section of the TLB locating in one LSI and a section of the BAA located in another LSI are not accessed at the same time. In FIG. 3, each of the TLBRA and BAA is divided into two sections. Depending on the state of the bit 19, whether it is "1" or "0", the sections are identified for a specific LSI. In particular, when the bit 19 of each is identified with "0", the address is stored in the LSI 60 and sections 61 and 62 of the respective TLBRA and BAA are used. When the bit 19 of each is identified with "1", the address is stored in the LSI 70 and sections 71 and 72 of the TLBRA and BAA are used. An address bit line 69 from the LAR 40 is supplied to both the LSIs 60 and 70. The TLBRA sections 61 and 71 are identified with the logical address bits 12–18, while the BAA sections 62 and 72 are identified with the logical address bits 18, and 20–24. Read out real addresses are compared by comparators 63 and 73, and upon coincidence the respective row numbers are encoded in encoders 64a, 64b, 74a and 74b. One of the respective outputs of the encoders 64a, 64b, 74a and 74b is selected by a selector 80 in accordance with the combination of the value of the bit 19 of the logical address set in the LAR 40 and the value of the output of an encoder 53. When the value of the bit 19 of the logical address set in the LAR 40 is "0", the respective outputs of the encoders 74a and 74b are made invalid while when it is "1" the respective outputs of the encoders 64a and 64b are made invalid. When the TLBLA coincidence signal put out from the encoder 53 indicates the row 0, the respective outputs of the encoders 64b and 74b are made invalid, while when the TLBLA coincidence signal indicates the row 1, the respective outputs of the encoders 64a and 74a are made invalid. In response to the BAA coincidence signal selected by the selector 80, a selector 82 selects one of the 16 rows of outputs of the BS 81 and puts out the same as data of 8 bites.

FIG. 3 shows a buffer memory control apparatus for instruction fetch or operand fetch. Also in the case of operand store, a circuit for judging into which one of the 16 rows of the BS 81 an operand is to be written is constituted on the basis of similar point of view to that described above. Further, when the logical address set in the LAR 40 has not been registered in the TLB, a real address corresponding to the logical address is obtained by well known means, the thus obtained real address is set in a real address register 41 (hereinafter abbreviated to "RAR"), and after determination of a row to be replaced by, for example, a least recently used (LRU) algorithm or the like, the bits 1–11 of the logical address are stored in that row of the column of the TLBLA 51 designated by the bits 12–19 of the logical address and the bits 1–19 of the real address set in the RAR 41 are stored in that row of the column of the TLBRA section 61 designated by the bits 12–18 of the logical address when the bit 19 of the logical address is "0" while stored in that row of the column of the TLBRA section 71 designated by the bits 12–18 of the logical address when the bit 19 of the logical address is Θ1". An address bit line 68 from the RAR 41 is supplied to both the LSIs corresponding to the bit line 69.

When a block designated by a logical address set in the LAR 40 has not been registered in the BAA, the logical address is translated into a corresponding real address by using the TLB, the thus obtained real address is set in the RAR 41, and after determination of a row to be replaced by, for example, an LRU algorithm or the like, the bits 1–19 of the real address set in the RAR 41 are stored in that row of the column of the BAA section 62 designated by the bits 18 and 20–24 of the logical address when the bit 19 of the logical address is "0". They are stored in that row of the column of the BAA section 72 designated by the bits 18 and 20–24 of the logical address when the bit 19 of the logical address is "1". A block designated by the logical address set in the LAR 40 is transferred to and stored in the BS 81.

We claim:

1. A buffer memory control apparatus comprising:
an address register for holding a logical address, the logical address having a first group of bits, a second group of bits, and a third group of bits, the groups being mutually exclusive of each other;
a buffer storage memory for storing a part of information stored in a main storage, the buffer storage memory being addressable by a combination of the first and second groups of bits;
a buffer address array for storing first real addresses of data blocks stored in said buffer memory;
a translation lookaside buffer for translating the logical address into a one of the first real addresses when an access request is made by said logical address, the translation lookaside buffer being addressable by a combination of the second and third groups of bits;

a plurality of real address storage portions provided in said translation lookaside buffer for storing second real addresses in columns of said plurality of real address storage portions, each real address storage portion being addressable by a combination of the first group of bits and a part of the second group of bits;

a plurality of buffer storage address sub-arrays provided in said buffer address array in such a manner that said plurality of buffer address sub-arrays are equal in number to said plurality of real address storage portions, for storing the first real addresses in columns, each of said plurality of buffer address sub-arrays being addressed by a combination of the first group of bits and a part of the second group of bits and being combined with said real address storage portions correspondingly and respectively to thereby form combinations of said real address storage portions and said buffer address sub-arrays, each combination being formed on a common LSI chip;

a plurality of comparator means, each disposed correspondingly and respectively to said combinations of said real address storage portions and said buffer address sub-arrays, each for detection of coincidence between a second real address obtained by translating the logical address for which the access request is made by using said address translation lookaside buffer, and a first real address stored in said buffer address array, each of the comparator means being formed on said LSI chip common to the combination; and, selection means for selecting one of the comparison results from a plurality of LSI chips based on the remaining part of the second group of bits.

2. The buffer memory control apparatus according to claim 1 wherein said combinations of said real address storage portions and said buffer address sub-arrays are formed on LSI chips respectively.

3. The buffer memory control apparatus according to claim 2 wherein said first comparator means are formed on said LSI chips together with said combinations corresponding to said first comparator means.

4. A buffer memory control apparatus comprising:
a buffer storage memory for storing a portion of information stored in a main storage memory;
a buffer address array for storing real addresses of data blocks stored in said buffer storage memory;
a translation lookaside buffer for translating a logical address into a main storage memory real address when an access request is made by said logical address, the lookaside buffer having a plurality of logical address storage portions;
a plurality of real address storage portions, obtained by dividing said translation lookaside buffer into portions, for storing a first set of real addresses in columns of said real address storage portions;
a plurality of buffer storage address sub-arrays obtained by dividing said buffer address array into portions, said plurality of sub-arrays being equal in number to said plurality of storage portions and being combined with said storage portions correspondingly and respectively to thereby form a plurality of combinations of said real address storage portions and said buffer address sub-arrays;

a plurality of first comparator means, disposed corresponding to said plurality of combinations of said real address storage portions and said buffer address sub-arrays, each for detecting coincidence between an address of the first set of real addresses and a data block real address stored in said address array;

selecting means, connected to an output of said comparator means, for selecting storage data of said buffer storage memory;

second comparator means for comparing an output of each of said plurality of logical address storage portions with the logical address, an output of said first and second comparator means being supplied to said selecting means so as to be used to perform the storage data selection.

5. A buffer memory control apparatus comprising:
a buffer memory for storing a part of information stored in a main storage;
a buffer address array storing a respective real address of data blocks stored in said buffer memory;
an address translation mechanism for translating a logical address having a translatable field, an untranslatable field, and a bit field, into a real address when an access request is made by said logical address;
a plurality of real address storage portions storing real addresses in respective columns of said real address storage portions, each portion being identified with the untranslatable field of the logical address, wherein the portions are obtained by dividing said address translation mechanism;
a plurality of buffer address sub-arrays obtained by dividing said buffer address array in such a manner that said buffer address sub-array are equal in number to said real address storage portions, said plurality of buffer address sub-arrays being identified with the translatable field of the logical address and combined with said real address storage portions correspondingly and respectively to thereby form combination sets of said real address storage portions and said buffer address sub-arrays, wherein each of the combination sets are formed on single LSI chips respectively;
comparator means, each disposed corresponding to said combination sets and each for detection of coincidence between a real address from a corresponding real address storage portion and a real address from a corresponding buffer address sub-array, wherein the comparator means are formed on said single LSI chips together with the combination sets corresponding to said comparator means; and,
selection means for selecting one result of comparisons from said comparator means based on said bit field of the logical address not used in identifying said real address storage portions.

6. The buffer memory control apparatus according to claim 5 wherein said address translation mechanism comprises a logical address storage portion for storing parts of bits of logical addresses in respective columns of said logical address storage portion and being identified with another part of bits of a logical address, and wherein said at least one common bit is a bit of another part of bits of a logical address.

7. The buffer memory control apparatus according to claim 5 wherein said combination sets are each formed on separate LSI chips, respectively.

8. The buffer memory control apparatus according to claim 5 wherein said comparator means are formed on said single LSI chips together with said combination sets corresponding to said comparator means.

9. The storage control system according to claim 5 wherein:
   said buffer address sub-arrays are divided into m rows which are identified by a third address portion, respectively;
   said real address storage portions are divided into n rows which are identified by the third address portion, respectively,
   said comparator means includes m x n comparators;
   each of said rows of said real address storage portions has an output connected to m comparators; and,
   each of said rows of said buffer address sub-arrays has an output to n comparators each connected to a different one of said rows of said real address storage portions.

10. A buffer memory control system for receiving a requested logical address from a processor, the control system comprising:
   a translation lookaside buffer for translating the logical address into a real address;
   a buffer storage for storing a copy of data stored in a main storage;
   means for detecting, when the processor requests data from the main storage, whether the requested logical address can be translated into the real address and whether the requested data is stored in the buffer storage;
   means for reading the data stored in the buffer storage for providing the data to the processor when both detections are positive;
   a logical address register for holding the logical address from the processor, the logical address having a translatable portion and an untranslatable portion;
   said translation lookaside buffer further having a plurality of real address storage memories for storing real addresses, each translation lookaside buffer being referred to by using the translatable portion of the logical address from the logical address register, a real address being read out as a result of the translation of the logical address;
   said buffer storage further having a plurality of buffer storage address sub-arrays for storing real addresses of copy data stored in the buffer storage, each buffer storage address sub-array being referred to by using the untranslatable portion and a first part of the translatable portion of the logical address from the logical address register so that the real address of copy data is read out;
   a plurality of comparator means for comparing the real addresses from the plurality of real address storage memories with the real addresses of copy data from the plurality of buffer storage address sub-arrays;
   a plurality of LSI chips, each having one of the plurality of real address storage memories, one of the buffer storage address sub-arrays and one of the comparators, whereby a comparison is made on each LSI chip between a real address from the real address storage memory with the real address of copy data from the buffer storage address sub-array;
   selection means for selecting a result from one of the comparisons from the plurality of the LSIs based on a second part of the translatable portion of a logical address from the address register, wherein the first part of a logical address and the second portion of a logical address do not overlap each other; and,
   means for obtaining requested data from the buffer storage based on the result of the selection means.

11. A buffer memory control apparatus comprising:
   a buffer memory for storing a part of information stored in a main storage;
   a buffer address array for storing data block real addresses of data blocks stored in said buffer memory;
   an address translation mechanism for translating a logical address into a translated real address when an access request is made by said logical address, said address translation mechanism including a plurality of logical address storage portions;
   a plurality of real address storage portions, obtained by dividing said address translation mechanism into the portions, for storing first real addresses in respective columns of said real address storage portions;
   a plurality of buffer storage address sub-arrays obtained by dividing said buffer address array, said real address storage portions and being combined with said real address storage portions correspondingly and respectively to thereby form combinations of said real address storage portions and said buffer address sub-arrays;
   a plurality of comparator means, each disposed correspondingly and respectively to said combinations of said real address storage portions and said buffer address sub-arrays, each for detection of coincidence between a real address obtained by translating the logical address for which the access request is made by using said address translation mechanism and one of the first real addresses stored in said address array;
   a selecting means connected to outputs of said plurality of comparator means for selecting one of the data blocks of said buffer memory; and,
   a second comparator means for comparing an output of each of said plurality of logical address storage portions with the logical address, an output of said second comparator means being supplied to said selecting means so as to be used to perform the data block selection.

* * * * *

UNITED STATES PATENT AND TRADEMARK OFFICE
CERTIFICATE OF CORRECTION

PATENT NO. : 5,050,126
DATED : September 17, 1991
INVENTOR(S) : Atsushi Tanaka, et al.

It is certified that error appears in the above-identified patent and that said Letters Patent is hereby corrected as shown below:

Claim 5, column 8, line 35, delete "sub-array" and insert therefor --sub-arrays--.

Claim 6, column 8, line 61, delete "of bits"
line 63, delete "of bits"
line 64, after "wherein" delete "said"
line 64, before "another" insert --said--
line 65, delete "bits of a" and insert therefor --said--

Signed and Sealed this

Thirteenth Day of April, 1993

Attest:

STEPHEN G. KUNIN

*Attesting Officer*   *Acting Commissioner of Patents and Trademarks*